(12) United States Patent
Walker et al.

(10) Patent No.: US 9,075,885 B2
(45) Date of Patent: Jul. 7, 2015

(54) SYSTEM FOR HANDLING A BROKEN UNIFORM RESOURCE LOCATOR

(75) Inventors: Peterson Walker, San Jose, CA (US); Pavan Mandava, San Ramon, CA (US); Ajit Shah, San Jose, CA (US); Eldho Syriac, San Jose, CA (US); Chun-Wu Chu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 443 days.

(21) Appl. No.: 13/082,355

(22) Filed: Apr. 7, 2011

(65) Prior Publication Data

US 2012/0259832 A1    Oct. 11, 2012

(51) Int. Cl.
G06F 17/30    (2006.01)

(52) U.S. Cl.
CPC ................................ *G06F 17/30887* (2013.01)

(58) Field of Classification Search
USPC ............ 707/781–783, 999.005; 709/223–224
See application file for complete search history.

(56) References Cited

U.S. PATENT DOCUMENTS

| | | | |
|---|---|---|---|
| 6,092,204 A * | 7/2000 | Baker | 726/5 |
| 7,290,131 B2 | 10/2007 | Beynon et al. | |
| 2006/0265489 A1* | 11/2006 | Moore | 709/223 |
| 2008/0263193 A1* | 10/2008 | Chalemin et al. | 709/224 |
| 2009/0119286 A1* | 5/2009 | Reisman | 707/5 |
| 2011/0231511 A1* | 9/2011 | Mo | 709/217 |

OTHER PUBLICATIONS

Michael Tyson; "Taking the 404 further"; Sep. 22, 2008. http://atastypixel.com/blog/taking-the-404-further/.
"Smart 404 Handler, A Customer Replacement 404 Error Pages For IIS—Evolved Code"; downloaded from: http://evlovedcode.net/content/code_smart404; 3 pages; Copyright 2000-2012.
Microsoft, "We are sorry, the page you requested cannot be found."; Jan. 2011; http://www.microsoft.com/file/not/found/example.html.
Eisenberg, "For Missing Web Pages, a Department of Lost and Found", Oct. 21, 2004; http://www.nytimes.com/2004/10/21/technology/circuits/21next.html?_r=2&ex=1256011200&en=5fc9d5b9a1919fbc&ei=5090&partner=rssuserland.
Blue Soup LLC, "Smart 404 Page not found handler", Jan. 20, 2007; http://www.mybluesoup.com/smart_404_page.asp.
Tyson, "Smart 404 for Wordpress", Sep. 26, 2008; http://atastypixel.com/blog/wordpress/plugins/smart-404/.

* cited by examiner

*Primary Examiner* — Syling Yen
(74) *Attorney, Agent, or Firm* — Lempia Summerfield Katz LLC (57) ABSTRACT

A method and apparatus for receiving a request for a Uniform Resource Locator (URL), determining the URL is broken, retrieving query data from a first database mapping the broken URL to the query data and retrieving one or more substitute URLs from a second database mapping the broken URL to the query data.

18 Claims, 9 Drawing Sheets

Products & Services   Support   How to Buy   Training & Events   Partners

Log In   Account   Register

The Page You Have Requested Is Not Available

NCIS Features Video Phone http://www-stage1.enterprise/web/solutions/small_business/products/routers_switches/index-hlml-tab-123

You might be looking for:

NCIS Features Video Phone —— 52 http://videolounge.enter.com

View All

You Might Also Try:

Support
Training and Events
Partner Information       10
Contacts
Feedback
Sitemap
Additional Search —— 11

FIG. 10

SYSTEM FOR HANDLING A BROKEN UNIFORM RESOURCE LOCATOR

TECHNICAL FIELD

The present disclosure relates generally to client/server communication.

BACKGROUND

When a user selects a Uniform Resource Locator (URL) usually in the form of a "link" on a website or saved as a bookmark to a document or webpage that has moved or has been deleted, typically the user will receive a standard "broken link" message reporting that the link is no longer valid. Broken links are a major impediment to internet user's ability to find information and documentation. Broken links are also a major contributing factor to website user dissatisfaction.

Broken link messages displayed when a broken URL is selected offer little or no help to assist the user to find the document or webpage they were seeking.

DESCRIPTION OF EXAMPLE EMBODIMENTS

Several examples of the present application will now be described with reference to the accompanying drawings. Various other examples of the disclosed technology are also possible and practical. This application may be exemplified in many different forms and should not be construed as being limited to the examples set forth herein.

The figures listed above illustrate various examples of the application and the operation of such examples. In the figures, the size of the boxes is not intended to represent the size of the various physical components.

Only those parts of the various units are shown and described which are necessary to convey an understanding of the examples to those skilled in the art. Additional aspects and advantages will be apparent from the following detailed description of particular embodiments. The illustrated embodiments and features are offered by way of example and not limitation. Furthermore, the described features, structures, or characteristics may be combined in any suitable manner in one or more embodiments. In general, the methodologies of the present disclosed technology may be carried out using one or more digital processors, for example the types of microprocessors that are commonly found in PC's, servers, laptops, PDA's and all manner of desktop or portable electronic appliances.

In the following description, certain specific details of programming, software modules, user selections, network transactions, database queries, database structures, etc., are provided for a thorough understanding of the embodiments of the disclosed technology. However, those skilled in the art will recognize that the disclosed technology can be practiced without one or more of the specific details, or with other methods, components, materials, etc.

Overview

In a particular embodiment, a broken Uniform Resource Locator (URL) handling device receives a request for an URL from a user terminal. The broken URL handling device determines that the URL request points to a resource that is no longer available via the URL. The broken URL handling device retrieves search query data to be used to identify substitute URLs. The broken URL handling device requests one or more substitute URLs from a search engine, the request including the search query data. Responsive to a sending the request for the one or more substitute URLs, the broken URL handling device receives one or more substitute URLs to communicate to the user terminal.

Example Embodiments

Broken URL System

Figure 1:
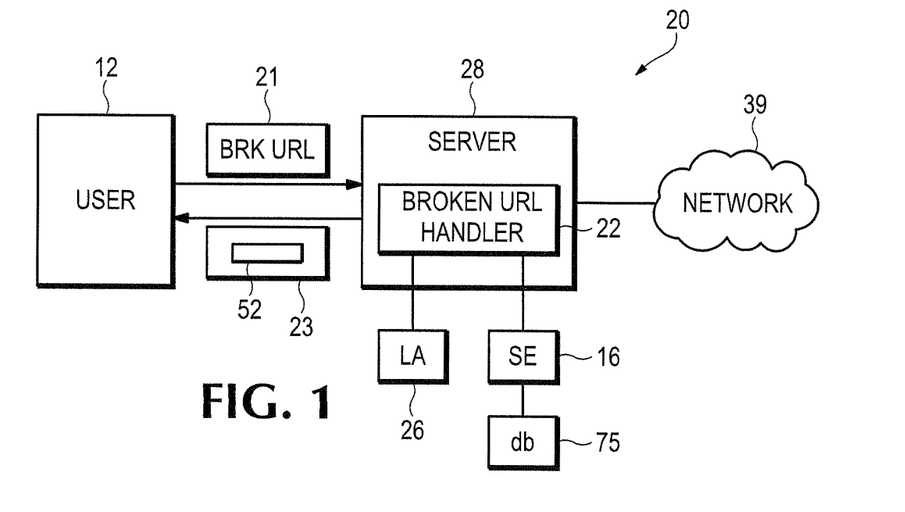
FIG. 1 illustrates an example embodiment of a broken URL handling system.

FIG. 1 illustrates an example embodiment of a broken URL handling system 20. The broken URL handling system 20 may be configured to augment an error message, such as a "404 File Not Found" error page with relevant search results that are automatically obtained from a search engine 16 query. The search engine 16 uses metadata as search terms such as, for example, the words in a title of the website/network resource being sought. The metadata (e.g., title) is associated with the broken URL in link archive 26 that may be configured to store URLs and map the URLs to metadata associated with the URL requested. For example, link archive 26 may store enterprise website URLs and map the URLs to titles associated with the URL.

In an example embodiment, the broken URL handler 22 receives a request from a user terminal 12 at the server 28 for a connection to an URL. The server 28 determines that the URL is no longer available on the network 38 because the corresponding html document and/or webpage has been deleted, renamed and/or removed. However, rather than sending a standard "404 File Not Found" error page, the server calls and/or invokes the broken URL handler 22 to identify one or more substitute URLs 52. The handler 22 can return one or more substitute URLs 52 to the user terminal 12 in an error message 23. The call to or invocation of the handler 22 by the server 28 may be made by any of a variety of methods known to those of skill in the art and claimed subject matter is not so limited.

In response to the call or invocation by the server 28, the handler 22 queries the link archive 26 to determine if the broken URL is stored in link archive 26. If the link archive 26 includes the broken URL, the link archive 26 sends the corresponding metadata to the handler 22 for use as one or more search terms by search engine 16 to identify substitute URLs.

The metadata from the link archive 26 may comprise a resource title. In a some embodiments, the title may be searched with the words of the title separated out or as a single phrase. Because document titles are usually descriptive and keyword rich, the substitute URLs 52 that are identified may point to the document or webpage the user is seeking or a close approximation thereto. The link archive 26 may store metadata types associated with the URLs other than title metadata including: keywords, language, country, tags, access level, unique website identification (ID), unique document ID and/or other metadata known to those of skill in the art.

The search engine 16 forwards any substitute URLs identified to the handler 22. The substitute URLs are returned to the user who may select, among the substitute URLs 52, the link most likely to point to the document or page that the user is seeking. This can assist users in finding the new location of the document and/or webpage they were seeking. Alternatively, if none of the substitute URLs 52 point to the specific resource the user was seeking, the substitute URLs 52 may point to one or more documents and/or webpages that are similar to the one that user was originally seeking.

Figure 2:
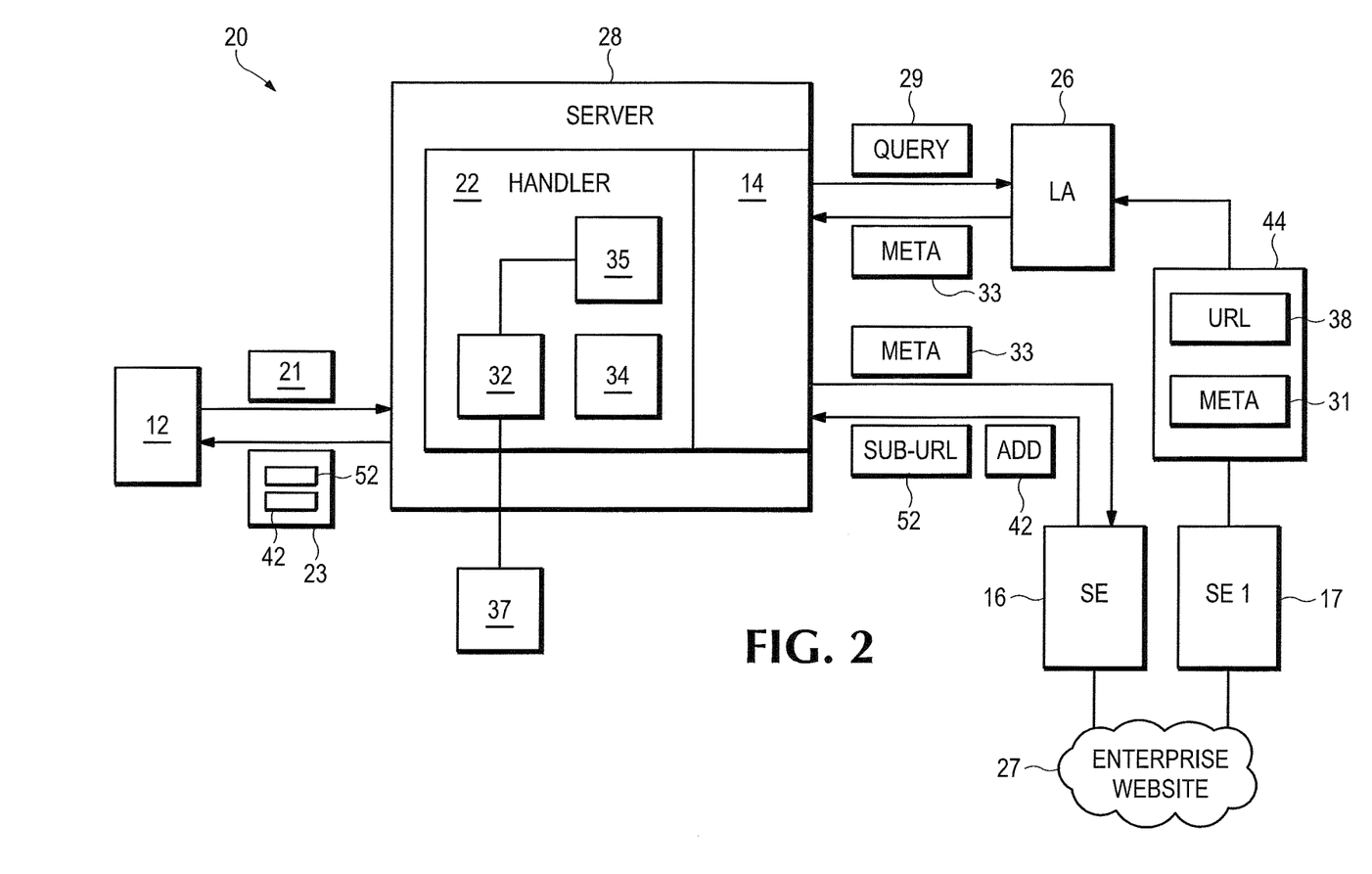
FIG. 2 illustrates an embodiment of a broken URL handling system.

FIG. 2 illustrates an embodiment of a broken URL handling system 20. The broken URL handling system 20 may comprise several components. Some components may be co-located in a single device or may be disposed in various separate devices.

In some embodiments, the broken URL handling system 20 includes a server 28 configured to receive an URL request message 21. If the server 28 determines that the requested URL is broken, then server 28 invokes the broken URL handler 22 to determine if there are substitute URLs 52 and/or additional results data 42 available to include with an error message communicated in an error page 23 responsive to the request message 21.

The handler interface 14 may communicate queries to a link archive 26 and search engine 16 to identify substitute URLs 52. The handler 22 may send a broken URL query 29 to link archive 26 via the handler interface 14,. Responsive to the query 29, the link archive 26 may identify and send metadata 33 that is associated with the broker URL to the handler 22. The metadata 33 may include a title of the resource corresponding to the broken URL. The handler 22 may send metadata 33 to the search engine 16 to identify substitute URLs 52 using the metadata 33. Substitute URLs 52 may be received by the handler 22. The handler 22 may return substitute URLs to the user terminal 12 via the error page 23 responsive to the message 21 requesting the broken URL.

A real-time processing module 34 may generate the error page 23 to return to the user terminal 12 in the event the user requests a broken URL. The error page 23 may comprise a standard "404 File Not Found" error message if no substitute URLs are identified. Alternatively, the error page 23 may comprise an error notification including the identified substitute URLs 52. The error page 23 may also include a 'more results' page to present additional substitute URLs and/or additional metadata to the user terminal 12 as query data for a user to conduct his/her own search for the requested resource in case the substitute URLs presented do not point to the requested resources or a suitable alternative.

Alternatively, the handler 22 may apply business rules to automatically redirect the user terminal 12 to a particular substitute URL. A metrics module 32 collects data associated with interactions of the user terminal 12 with the error page 23. The metrics-tracking module 32 monitors queries, results, user selection of substitute URLs 52 and/or feedback questionnaires. The metrics collected may be used to set-up the business rules in a self-healing module 35 for dealing with future requests for broken URLs.

Figure 3:
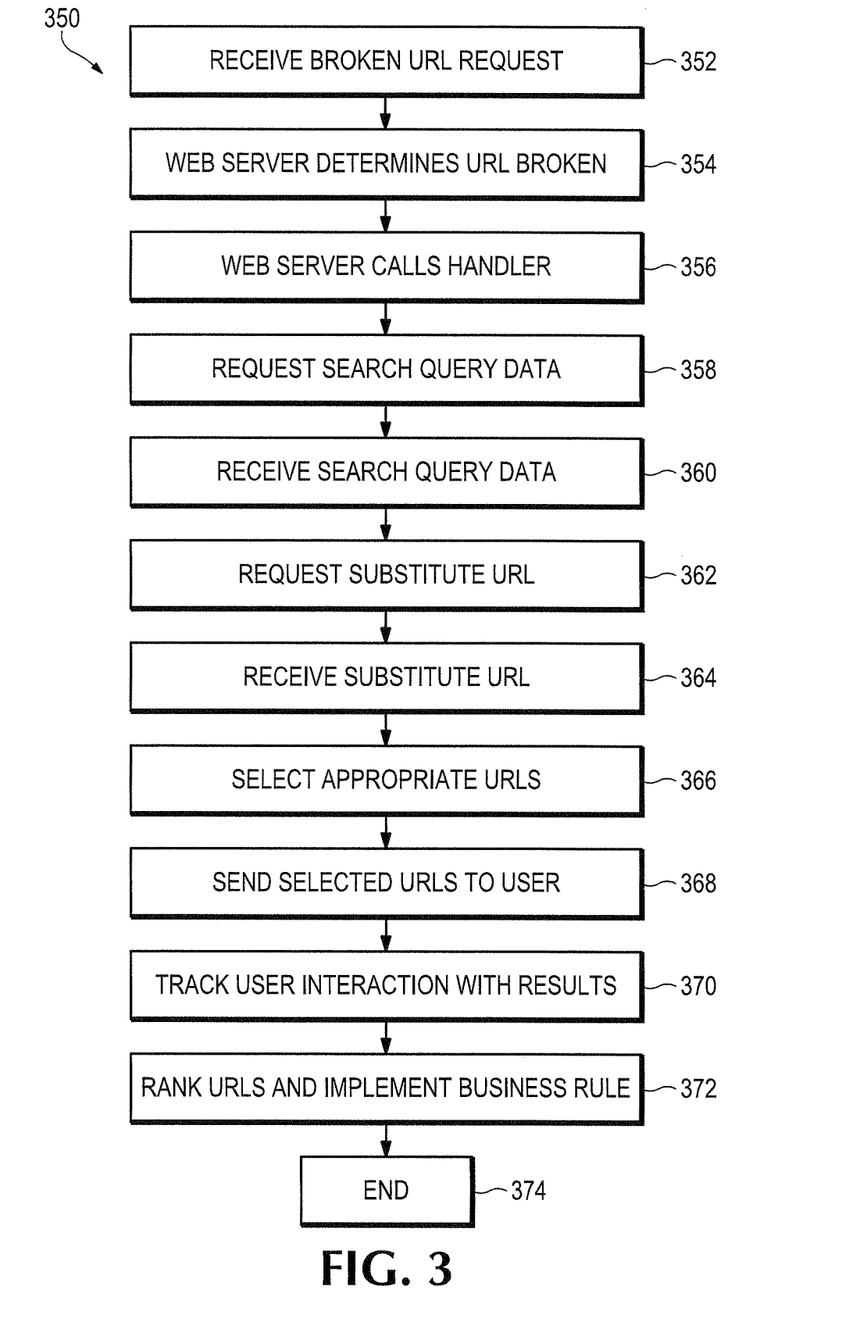
FIG. 3 illustrates an example process for handling broken links.

A first search engine instance 17 may index a target enterprise website 27 and update the link archive 26 with current and/or new URLs 38 and corresponding metadata 31 via a link archive update module 44. These and other components are described in more detail below FIG. 3 illustrates an example process 350 for handling broken links. The example process begins at block 352 where a web server receives a request from a user terminal for a broken URL. At block 354, the web server determines that the link is broken. The web server calls a broken URL handler to determine if there are substitute URLs available to suggest within a broken URL error page at block 356. At block 358, the handler requests search query data (e.g., metadata) corresponding to the broken URL from a first database. At block 360, the handler receives the requested search query data from the first database. The process continues to block 362 where the handler requests one or more substitute URLs from a second database.

In some embodiments, the second database includes a search engine configured to identify substitute URLs responsive to the search query data. The search engine may be configured to search for substitute URLs according to any of a variety of search algorithms known to those of skill in the art and the claimed subject matter is not so limited. If the search engine identifies one or more substitute URLs, at block 364, the handler receives a message including the one or more substitute URLs from the search engine responsive to the request for the one or more substitute URLs.

The handler selects appropriate substitute URLs to send to the user at block 366. In some embodiments, the handler may determine an access level (or entitlement) of the user and use the access level to select the substitute URLs accessible at the user's access level to send to the user, omitting substitute URLs not accessible at the user's access level. Additional customization parameters may be used by the handler to filter the list of substitute URLs to return to a user. Such customization parameters may include, language and/or country or any other available parameters that could be used to identify appropriate substitute URLs.

The handler returns an error message to the user terminal including the substitute URLs at block 368. The substitute URLs returned may or may not be customized.

At block 370, the handler may track the broken URLs and a number of times users select each of the one or more substitute URLs corresponding to the broken URL.

At block 372, the handler may rank the one or more substitute URLs according to the tracking records and create one or more business rules based on the tracking in order to execute self-healing procedures such as redirecting to a higher-ranking substitute URL or prioritizing manual URL repairs based on the tracking.

At block 374, the process ends.

Broken URL Handler

Figure 4:
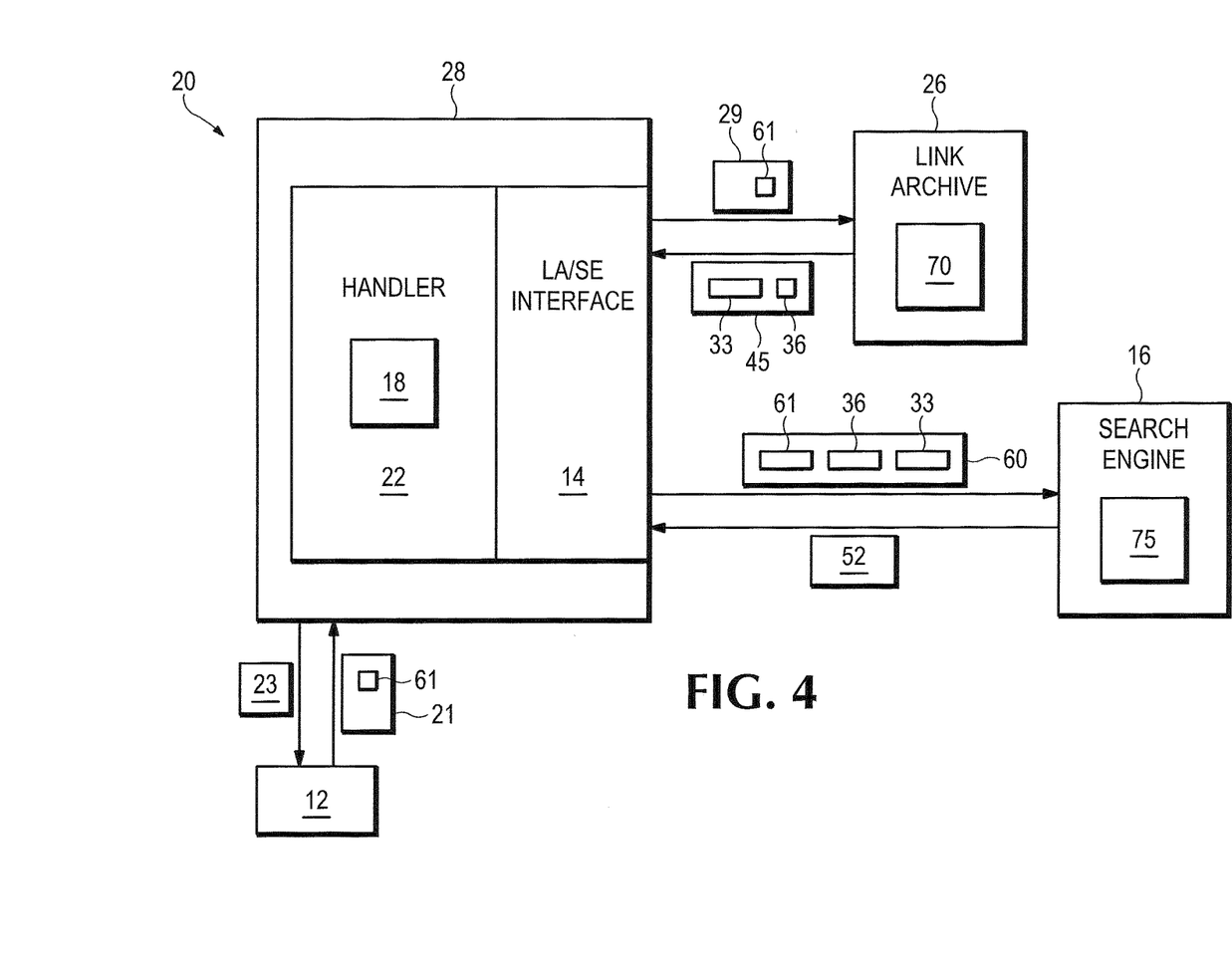
FIG. 4 illustrates an example embodiment of a broken URL handling system.

FIG. 4 illustrates an example embodiment of a broken URL handling system 20. In some embodiments, the handler 22 may reside on a web server 28 in hardware, software embodied in a tangible medium and/or firmware embodied in a tangible medium.

The web server 28 may be configured to receive a request message 21 requesting access to a resource such as a web page and/or document. The request message 21 may include an URL pointing to the resource. If the resource is available via the URL, the server 28 responds by sending the resource in Hypertext Mark-Up Language (HTML) or other appropriate mark-up, scripting or style-sheet language (e.g., XML, PHP and/or DHTML) to a user terminal 12.

If the web server 28 instead determines that the resource is not available at the location indicated by the URL, then the server 28 may route the request to the handler 22 to generate an error page 23, for instance a "404 File Not Found" error page. Prior to returning the error page to the user terminal 12, the handler 22 queries the link archive 26 and search engine 16 to determine whether there are one or more appropriate substitute URLs 52 to return to the user terminal 12.

In one embodiment, the handler 22 may communicate with the link archive 26 and the search engine 16 via a handler interface 14. The handler interface 14 may send a query 29 identifying the broken URL to a link archive 26. The broken URL may be sent to the link archive 26 as a fully-formed URL including the protocol and domain name or as a partial URL.

The link archive 26 may contain a database 70 configured to map URLs to corresponding title(s) 36 and/or additional metadata 33. In one embodiment, database 70 stores historical link data for a particular website. Thus, database 70 may contain a resource title associated with a webpage or document that the broken URL pointed to at one time and for which the user is searching. Populating and updating database 70 is discussed in greater detail below.

If the broken URL is not stored in the link archive 26, the link archive 26 will indicate that the URL does not exist in its database 70, and the handler 22 will return a standard error message to the user such as, for instance, a "404 File Not Found" error page.

If the broken URL is stored in link archive 26, responsive to query 29, the link archive 26 may retrieve a corresponding title 36 from database 70 and return the corresponding title 36 to the handler 22. In other embodiments, the database 70 may map the broken URL to a variety of corresponding metadata and send the additional metadata 33 to the handler 22 along with the title 36 in a response message 45 responsive to query 29.

The handler 22 may be configured to generate and send a request 60 for one or more substitute URLs 52 to the search engine 16. The request 60 may contain the words of the title 36 to be used as search terms to conduct a search of the database 75. The database 75 may be configured to store an index of a particular website, the Internet and/or a particular private network. Search engine 16 may be configured to query the database 75 responsive to the request 60 to identify substitute URLs by using the words of title 36 as search terms. The words of the title may be searched as a phrase or as separate words.

In another embodiment, if additional metadata 33 is sent from the link archive 26 along with the title 33, or instead the additional metadata 33 may be used alone or in conjunction with the title words to search the database 75 to identify substitute URLs 52. For example, the additional metadata may comprise a unique webpage identification (ID) and/or a unique document ID. Such webpage or document IDs may be stored in the database 75 and may be used to identify one or more substitute URLs that are likely to point to the resource requested in the request 450. Additionally or alternatively, the metadata 33 may include any metadata known to those of skill in the art and claimed subject matter is not so limited. For example, metadata 33 may include one or more of the following: access level, country, last update time, language and/or tags.

In some embodiments, the title 36 and/or the additional metadata 33 may be used to rank substitute URLs in order of relevance. A predetermined number of substitute URLs may be presented to user terminal 12 based on relevance of the substitute URLs.

One or more additional search parameters 61 may be used to identify appropriate substitute URLs. Search parameters 61 may be leveraged in several different ways either alone or in combination. Search parameters 61 may be sent to link archive 26 to be used to constrain the search for title and/or metadata, for example. Additionally, search parameters 61 may be sent to the search engine 16 from the handler 22 along with the title 36 and/or metadata 33 to be used to limit the search of database 75 for substitute URLs 52. Search parameters 61 may also be used by the handler 22 to select appropriate substitute URLs from a listing of one or more substitute URLs 52 sent by the search engine 16.

The additional search parameters 61 may be parsed from the broken URL itself by parser 18. For example, the URL, http://www.enterprise.com/FR/CA/partner/products/index23.html, identifies the language as French (the abbreviation "FR" in the URL), the country as Canada (the abbreviation "CA" in the URL) and the access level as "partner" (the term "partner" in the URL). In some embodiments, such search parameters may be used to limit searches performed by the link archive 26 and/or search engine 16. For example, the search engine 16 may limit the search for substitute URLs to resources available in French, originating from servers located in Canada and where the access level is indicated as "partner." In some embodiments, fewer than all of the identified additional search parameters 61 may be used to inform the search performed by the search engine 16 to yield more results.

Additionally, search parameters 61 may be communicated in the request message 21, determined by default, and/or communicated from the user terminal 12 to the handler 22 by any other method known to those of skill in the art and claimed subject matter is not so limited. For example, search parameters may be communicated in example, a cookie including a user access level sent from the user terminal 12 to the handler 22 responsive to an access level query.

Link Archive

Figure 5:
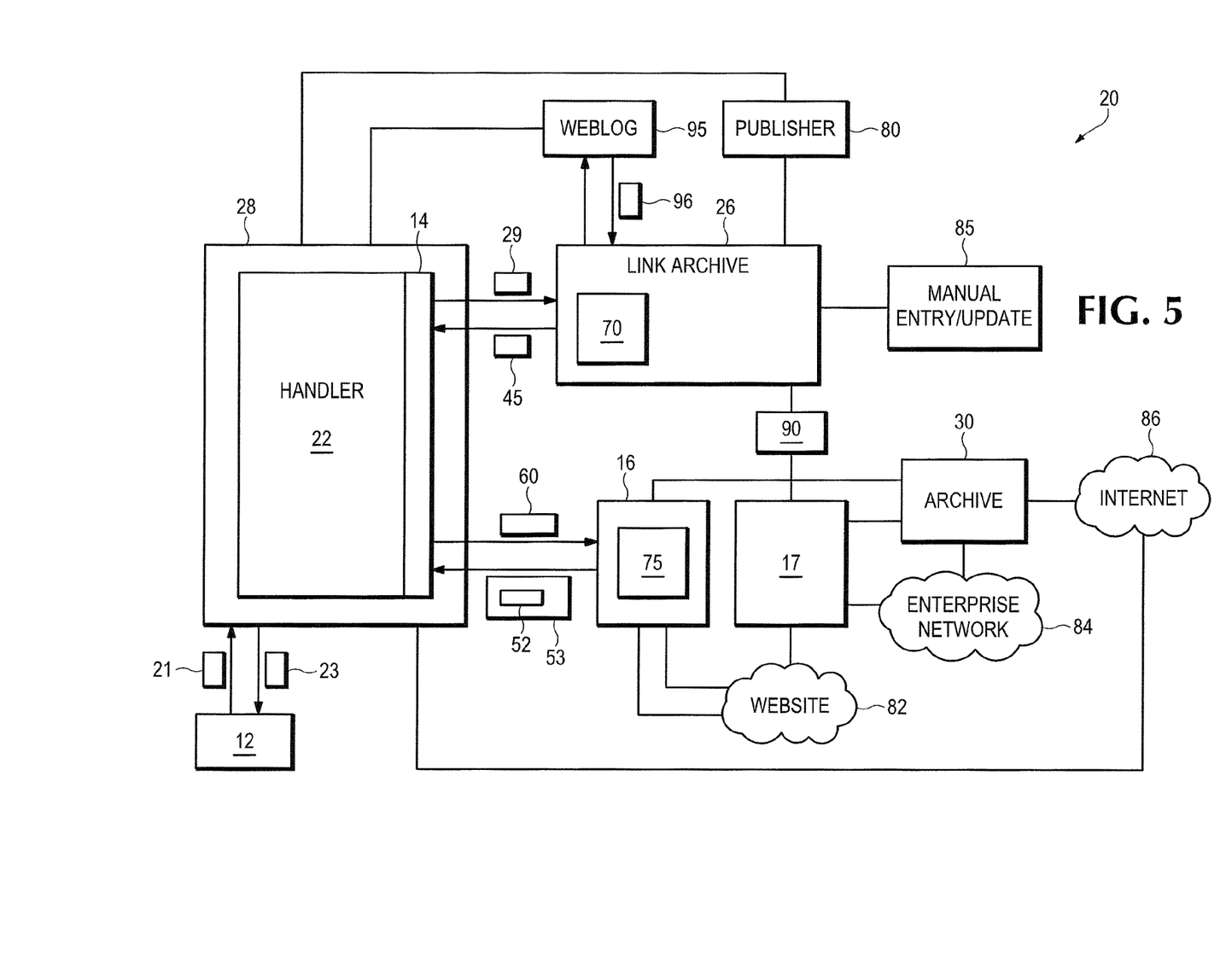
FIG. 5 is a block diagram illustrating an example embodiment of a broken URL handling system.

FIG. 5 is a block diagram illustrating an example embodiment of a broken URL handling system 20. Responsive to a query 29 for a broken URL, the link archive 26 searches the database 70 for the broken URL to retrieve and return title data and/or metadata corresponding to the broken URL to be used in a search for substitute URLs by the search engine 16. The database 70 may comprise URLs mapped to a corresponding title (if known) and/or other metadata.

In some embodiments, the database 70 may be configured to store data corresponding to known URLs that have been published to a website 82, enterprise network 84 and/or the Internet 86. The database 70 may be initially populated and/or updated by the search engine 16 and/or 17, a website publisher 80 and/or by a user via interface 85. A user may manually add additional updates for URLs or corresponding URL metadata to the database 70 at a manual entry/update interface 85. In some embodiments, publisher 80 may be the enterprise network's publishing system.

As URLs are added to the link archive 26, the URLs may be processed for quality and to determine if the URLs are the versions currently in use. In some embodiments, this may be executed as a onetime processing of URLs.

The database 70 may comprise multiple fields for storing a title and/or a variety of metadata corresponding to the URLs including, one or more of the following; entitlement and/or access level, country, update time(s), unique webpage ID, unique document ID, language, metadata and tag(s). If, during initial population or updating, certain values/metadata are not available for a resource (corresponding to an URL in database 70) the link archive 26 may use a default value. For instance, if an access level, country and/or language are not available, these values may be defaulted to a lowest access level, English and the United States. In some embodiments, the missing values will not be defaulted in the database 70. In some embodiments, in the link archive 26, URLs may be unique and thus may be identified in the database 70 as a primary key. Various fields may additionally include business rules corresponding to the associated URL. Business rules may dictate a method for conducting a search of the database 70 or the database 75 such as, for example, according to a source of data stored in the selected database.

Additionally, the link archive 26 may be populated with broken links mined from the web server's access log 95 to retrieve an access log listing 96 of broken URLs reportedly accessed. The list of broken URLs from the access log 95 may be added to the database 70, even where there is no title data. Title and other data may be retrieved at a different time during initial population of the database 70 and/or during subsequent updates. The database 70 may be selectively populated with broken URLs from the access log 95 requested only by bona fide users.

In some embodiments, certain categories of URLs may be excluded from the database 70 such as, for example, links to graphic files, cascading style sheet (CSS) files and/or JavaScript files. Thus, the database 70 may comprise URLs linking to a select group of resources such as, web pages or documents only.

Updates by the search engines 16 and/or 17 may add any new URLs (and corresponding titles and/or metadata) discovered during crawls of a target website, enterprise network and/or the Internet. Updates to the database 70 by a website publisher 80 may provide new URLs (and corresponding titles and/or metadata) added since a last update. Over time, such updating may provide ever increasing broken URL coverage. In some embodiments, URLs and corresponding title and/or metadata already existing in the link archive 26 may not be updated or deleted; only new URLs and corresponding title and/or metadata may be added. In other embodiments, URLs and corresponding title and/or metadata existing in link archive 26 may be updated; however, the existing URLs and corresponding title and/or metadata may not be deleted.

Search Engines

Referring still to FIG. 5, in some embodiments, if the link archive 26 identifies the requested broken URL in its database 70, the link archive 26 sends search terms comprising corresponding title and/or metadata to the handler 22 in the response message 45. The handler 22 forwards the search terms to the search engine 16 in a substitute URL request message 60, requesting the search engine 16 to identify appropriate substitute URLs 52.

In some embodiments, the search engine 16 comprises a database 75 of one or more indexed websites, an enterprise network, and/or the Internet. The search engine 16 receives search terms in the request message 60 from the handler 22 via the handler interface 14 and searches the database 75 to identify one or more substitute URLs 52. The substitute URLs may point or link to resources that are either the same as the resource the user was seeking or similar to the resource the user was seeking. The search engine 16 may use one, some or all of the search terms sent in the request message 60 received from the handler 22. The search engine 16 may determine search result relevancy by any of a variety of methods known to those of skill in the art and claimed subject matter is not so limited.

The search engines 16 and/or 17 may be configured to browse and index the website 82, enterprise network 84 and/ or the Internet 86, such as by crawling and/or spidering or any other method of website and/or network resource browsing and indexing known to those of skill in the art and claimed subject matter is not so limited.

The database 70 may be initially populated by the search engines 16 and/or 17 configured to execute an initial crawl of an archive database 30 configured to store historical website data and/or networked website data such as the "Internet Archive: WayBack Machine."™ By using archival data to initially populate the link archive 26, the link archive 26 may be populated with URLs and corresponding metadata that may have been deleted/moved/renamed prior to the application of a broken URL handling system.

In some embodiments, metadata corresponding to a retrieved URL is published to the database 70 in the link archive 26. The metadata may include resource title, keywords, language, country, tags, access level, unique website ID, unique document ID and/or other metadata known to those of skill in the art and claimed subject matter is not so limited.

The search engine 16 and/or the search engine instance 17 may be configured to execute a one-time crawl against the archive database 30 to index and store all URLs of interest found within the archive database 30 in the database 70. The URLs of interest may correspond to the website 82, enterprise network 84 and/or the Internet 86 for instance.

In other embodiments, the database 70 may be initially populated by the search engine 16 by crawling (or another method of browsing and indexing) the archive database 30, wherein the archive 30 may be a private website archive indexing historical website data including URLs, corresponding metadata, and resources available on the website. In some embodiments, updates to the database 70 may be executed by a web server 28 and/or the publisher 80, wherein the web server 28 and the publisher 80 are associated with the website 82. Other entries and updates may also be input manually by a user at the entry/update interface 85.

In some embodiments, the search engine 16 or the search engine instance 17 may be configured to continuously and/or periodically execute additional crawls (i.e., browsing and indexing) of the website 82, enterprise network 84 and/or the Internet 86 to update the link archive 26 by adding new URLs and corresponding metadata identified during the update. Metadata corresponding to URLs of any new resources discovered during the updated crawl are published to the link archive 26. In one embodiment, URLs, titles and metadata already stored in the database 70 may be updated.

In some embodiments, the search engine 16 may return a result 53 including a limited number of substitute URLs 52 to the handler 22 based on relevancy. For instance, the result 53 may include the top five most relevant substitute URLs 52. Such results 53 may include a variety of other data as well and may be presented in any format known to those of skill in the art, such as, JavaScript Object Notation (JSON), for example. In some embodiments, the result 53 may include: a substitute URL, title, snippet of the resource, date, language, country, access level, and corresponding broken URL. These results 53 may be provided to the user terminal 12 in an enhanced error message 23 responsive to the request message 21.

Link Archive Updater

Referring still to FIG. 5, the search engine instance 17 may be configured for updating the link archive 26. In this way, updating processes may be separated from search processes executed by the search engine 16. The search engine instance 17 may crawl (i.e., browse and index) the website 82, enterprise network 84 and/or the Internet 86 searching for active URLs not yet stored in the database 70 in the link archive 26. If new URLs are identified by the search engine instance 17, the updater 590 may publish the new URLs, corresponding title and/or additional metadata to the database 70 in the link archive 26. The updating may be executed by any methods known to those of skill in the art. The frequency of updates may vary. In another embodiment, the search engine 16 may execute all of the updating functionality of the search engine instance 17.

In some embodiments, URLs and corresponding metadata already stored in the database 70 may not be updated. Rather, newly identified URLs and corresponding metadata may be added to avoid removal of broken or deleted URLs from the database 70.

Figure 6:
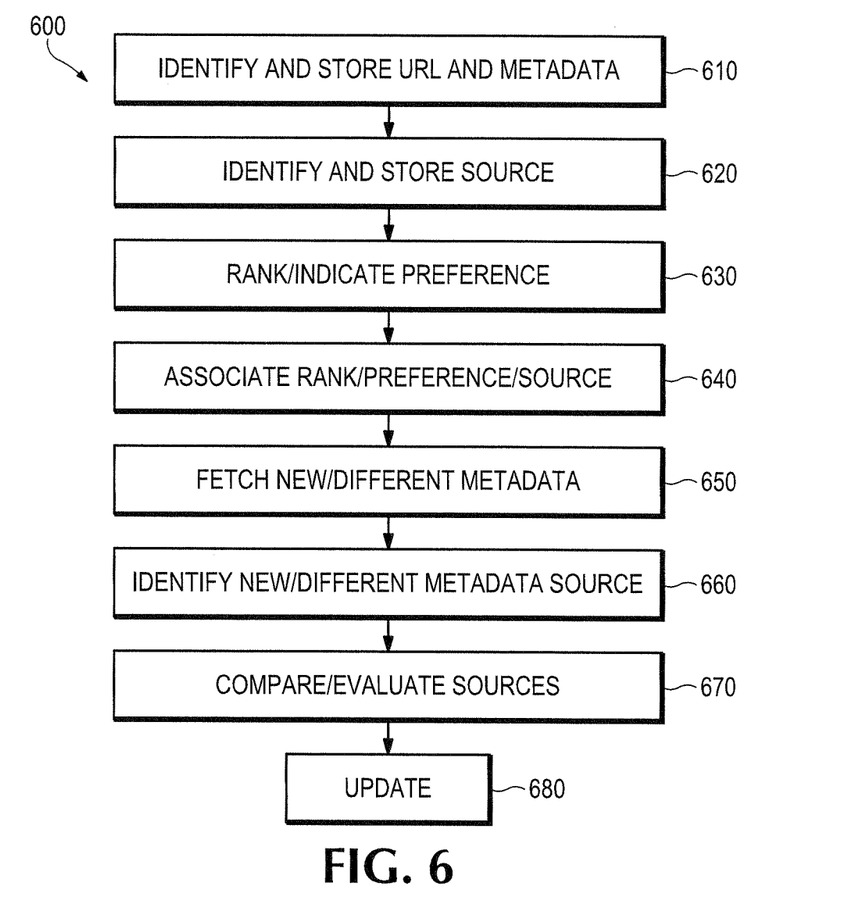
FIG. 6 is a flow diagram illustrating an example embodiment of a process for determining if URLs and/or metadata currently stored in a database of a system for handling broken URLs should be updated.

FIG. 6 is a flow diagram illustrating an example embodiment of a process 600 for determining if URLs and/or metadata currently stored in database 70 (see FIG. 5) should be updated.

In some embodiments, the source of one or more URLs and metadata may be accessed by a device configured for updating the database 70 such as the search engine 16, search engine instance 17 and/or publisher 80.

The process begins at block 610 where an URL and associated metadata may be identified and stored in the database 70 of the link archive 26.

The process flows to block 620, where the source of the URL and/or metadata may be identified and stored. Such sources may include, for example, the Internet Archive: Way-Back Machine™ and/or the enterprise network.

At block 630, the identified source may be ranked and/or a preferential status may be assigned to the source using a business rule. In some embodiments, URL and metadata sources may be ranked according to preset ranking criteria and/or a single source may be identified as a preferred source of URLs and/or metadata.

In some embodiments, at block 640, the source, rank and/or preferential status may be associated with the corresponding URL and/or associated metadata in the database 70.

At block 650, during a link archive 26 update, new and/or different metadata may be fetched. In some embodiments, the new and/or different metadata may be associated with the URL currently stored in the database 70. In some embodiments, a source of the new and/or different metadata may be identified at block 660.

At block 670, the source of the metadata currently stored in the database 70 and the source of the new and/or different metadata may be compared and/or analyzed to determine whether to update the metadata in database 70 based on the comparison and/or analysis.

At block 680, the database 70 may be updated. In some embodiments, if the rank of the source of the new metadata is higher than the rank of the source of the metadata currently stored in the database 70, then the metadata may be updated by adding the new and/or different metadata to the database 70 in association with the currently stored URL. In some embodiments, if the new and/or different metadata is added to the database 70, corresponding old metadata if it exists in database 70 may be removed. In some embodiments, if the rank of the source of the new metadata is not higher than the rank of the source of the metadata currently stored in the database 70, then the currently stored metadata may not be updated.

In some embodiments, if the source of the new and/or different metadata is indicated as a preferred source, then the metadata may be updated by adding the new and/or different metadata to the database 70 in association with the currently stored URL and corresponding old metadata if it exists in the database 70 may be removed.

Figure 7:
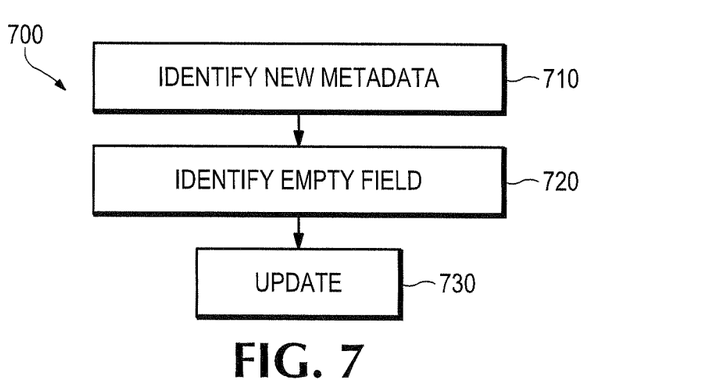
FIG. 7 is a flow diagram illustrating a different example embodiment of a process for determining if URLs and/or metadata currently stored in a database of a system for handling broken URLs should be updated.

FIG. 7 illustrates a different embodiment of a process for updating the link archive 26. The process begins at block 710 where, during a link archive update, new metadata associated with an URL currently stored in the database 70 may be identified.

At block 720, an empty field in the database 70 corresponding to the new metadata may be identified.

At block 730, the link archive may be updated by adding the new metadata to the empty field in association with the currently stored URL. In some embodiments, the update may be made without considering or despite the source of the new metadata.

Real-Time Processing User Interface

Figure 8:
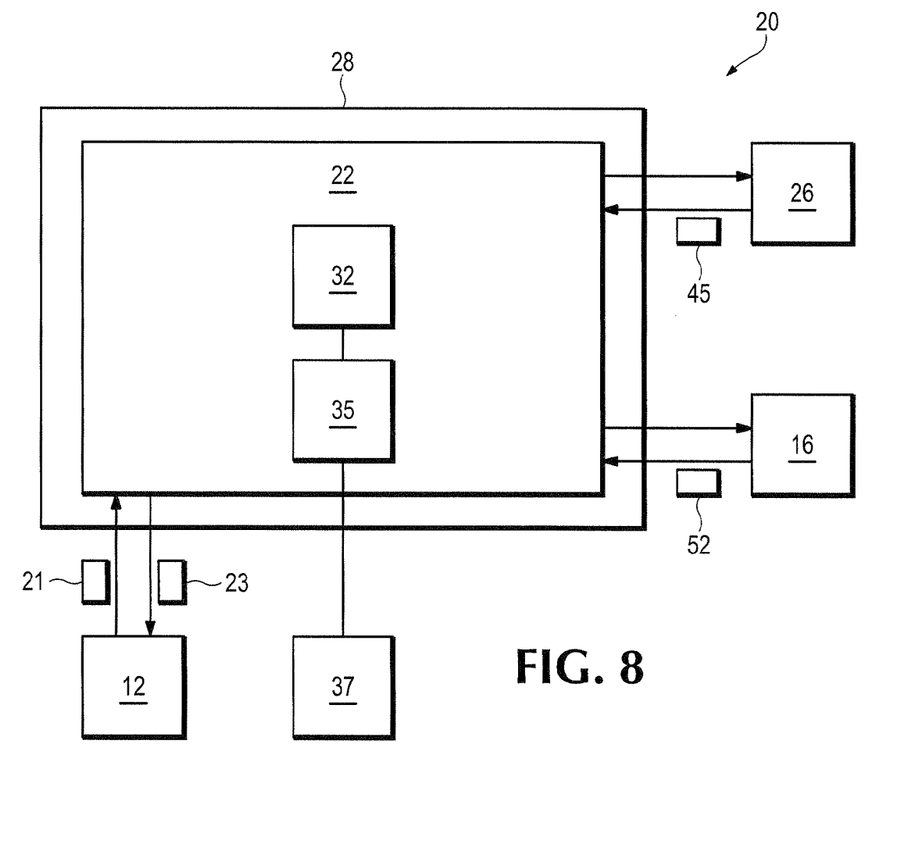
FIG. 8 illustrates an example embodiment of a broken URL handling system.

FIG. 8 illustrates an example embodiment of a broken URL handling system 20. In some embodiments, when a broken URL is requested, the handler 22 requests information about the broken URL from the link archive 26 and the search engine 16. If the handler 22 receives one or more substitute URLs 52 from the search engine 16, then the handler 22 returns an error page 23 including links to the substitute URLs.

Figure 9:
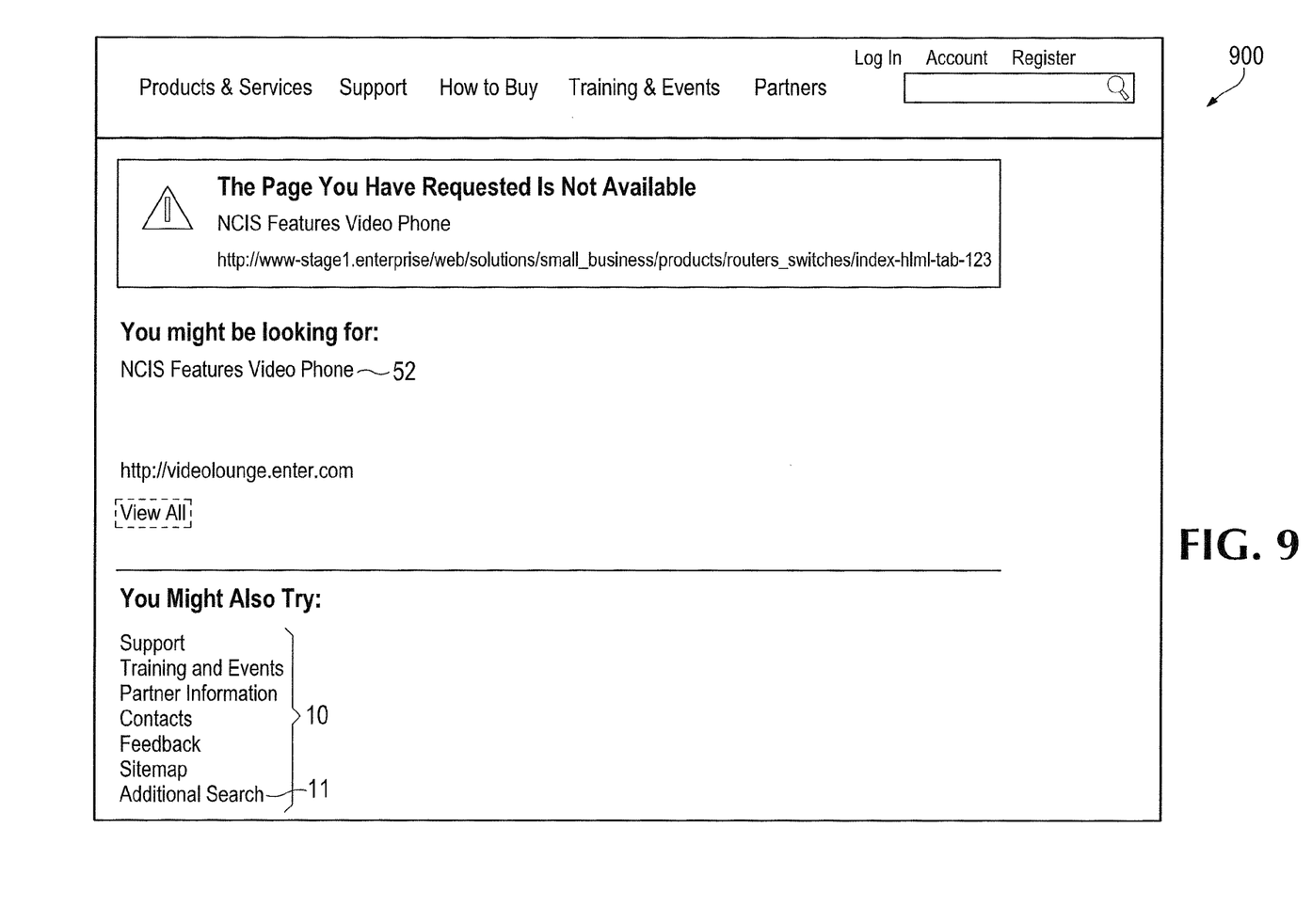
FIG. 9 illustrates an example embodiment of graphical user interface (GUI) page that may be returned to a user terminal.

FIG. 9 illustrates an example embodiment of graphical user interface (GUI) page 900 that may be returned to a user by the handler 22 when the substitute URLs 52 are identified. In some embodiments, page 900 may be an augmented "404 File Not Found" error page. In some embodiments, page 900 may be implemented by embedding one or more substitute URLs 52 into a standard "404 File Not Found" error page.

If a location of a user is identified in the request 21, the page 900 may be localized to include presentation in a local language. Alternatively, the page 900 may be displayed in a default language if no user location is identified.

In some embodiments, a predetermined number of results may be displayed, such as, for instance, the top five most relevant substitute URLs 52 may be displayed to the user. In some embodiments, a user may access additional substitute URLs by selecting "view all."

In some embodiments, page 900 may present a user with additional options for seeking the requested resource in the event the substitute URLs presented do not point to the resource sought by the user or a satisfactory equivalent. For example, in one embodiment, the page 900 may include a "you might also try" section displaying additional links 10 for a user to try.

If the user selects one of the links 10, such as additional search 11, additional search parameters may be provided to the user by the handler 22 in response. Such additional parameters may include: one or more document title terms, a unique document identifier (ID), a unique webpage identifier (ID), geographic location information, a language, an access level or country, or combinations thereof.

In some embodiments, page 900 may yield results associated with a user's access level or entitlement. Thus, the substitute URL 52 and/or links 10 returned to a particular user may be customized according to the requesting user's access level. In some embodiments, entitlement and/or access level may be ascertained by inspecting session information rather than search parameter data supplied by the link archive 26. Further, access level or entitlement data may be different from the access level or entitlement data sent to the handler 22 from the link archive 26.

In a some embodiments, when a user terminal 12 requests a broken URL, the handler 22 may receive an indication that the broken URL or corresponding search terms may not be identified in the link archive 26. Alternatively, the handler 22 may receive search terms (e.g., title and metadata) from the link archive 26 and may request substitute URLs from the search engine 16 based on the search terms. However, the search engine 16 may be unable to identify a substitute URL and may send the handler 22 an indication that no substitute URLs were identified. In either case, the handler 22 may return a standard "404 File Not Found" error page without embedding substitute URLs.

Figure 10:
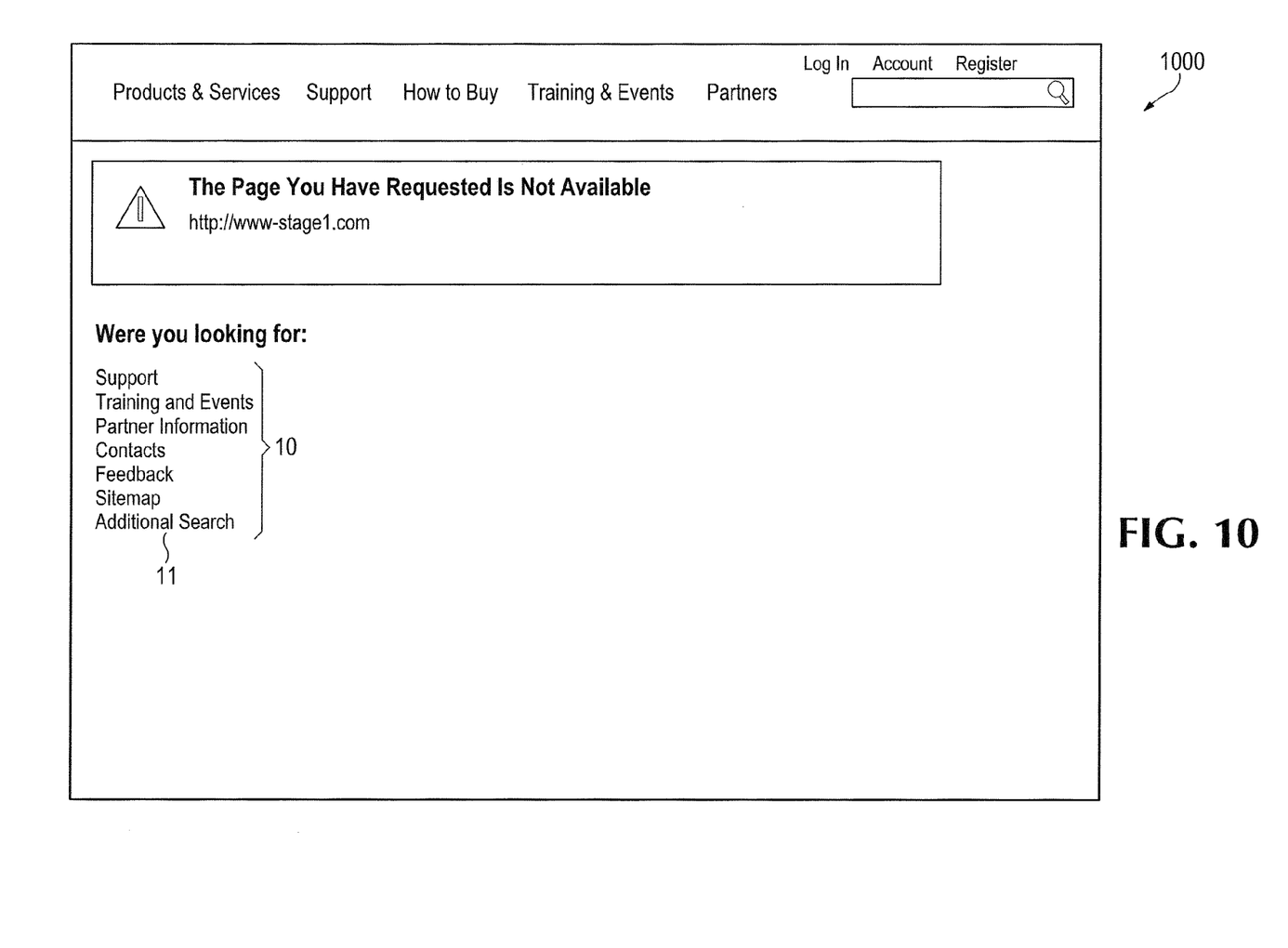
FIG. 10 illustrates another example embodiment of graphical user interface (GUI) page that may be returned to a user terminal.

FIG. 10 illustrates another example embodiment of graphical user interface (GUI) page 1000 that may be returned to a user terminal 12 by the handler 22. In some embodiments, if search terms including title and/or metadata are identified in a response message 45 from the link archive 26 and the search engine 16 is unable to identify one or more substitute URLs, the handler 22 may return file not found page 1000. The page 1000 may indicate that the URL requested is unavailable. However, the page 1000 may include links 10 and additional search terms 11 identified by the link archive 26. Such additional links may allow a user to carry out an additional search.

Metrics and Self-Healing

Referring again to FIG. 8, in some embodiments the handler 22 may store data associated with the request 21 for the broken URL, such as the name of the requesting party and the broken URL itself. Metrics associated with requests for broken URLs may be collected by a variety of methods known to those of skill in the art and claimed subject matter is not so limited. For example, in some embodiments, the substitute URL error page 23 may be assigned certain metrics event tags. The events may be collected and stored in metrics module 32.

In some embodiments, the handler 22 may communicate with a web analytics server 37 (e.g., UNICA™) to capture the data collected. The analytics server 37 may log additional metrics about all aspects of the broken URL handling system 20 and provide reporting and data about all aspects of the broken URL problem. For instance, the analytics server 37 may determine, how many broken URLs are requested for a particular webpage, which broken links are hit the most and collect user/traffic data corresponding to particular broken URL request. The analytics server 37 may report such data back to the handler 22 to be used by the self-healing module 35. In some embodiments, either or both the metrics module 32 and the web analytics server 37 may capture data about the broken URL and user interactions associated with the error page 23.

In some embodiments, results may be recorded when a user selects one of the substitute URLs. The results may be analyzed to determine which of the substitute URLs is selected most often. In some embodiments, such data may be used to create business rules for prioritizing repair of broken URLs and/or automatically redirecting users to the most frequently selected substitute URL to automate repair of broken URLs.

For example, in some embodiments, a business rule to automate self-healing may comprise: if the a particular substitute URL is selected 85% of the time or higher compared to other substitute URLs presented, then automatically publish a 301 redirect in place of the missing URL so that subsequent visitors to the same broken URL will automatically get redirected to the substitute URL.

Many modifications and other embodiments of the disclosed technology will come to mind to those skilled in the art to which this disclosed technology pertains having the benefit of the teachings presented in the foregoing descriptions and the associated drawings. Therefore, it is to be understood that the disclosed technology is not to be limited to the specific embodiments disclosed and that modifications and other embodiments are intended to be included within the scope of the appended claims. Although specific terms are employed herein, there are used in a generic and descriptive sense only and not for purposes of limitation.

It will be obvious to those having skill in the art that many changes may be made to the details of the above-described embodiments without departing from the underlying principles of the disclosed technology. The scope of the present disclosed technology should, therefore, be determined only by the following claims.

The invention claimed is:

1. An apparatus, comprising:
   a processing device; and
   a memory coupled to the processing device comprising instructions executable by the processing device, the processing device configured when executing the instructions to:
      determine a Uniform Resource Locator (URL) that points to a resource that is not available via the URL;
      send a request for search query data to a link archive in a first database, the request including the URL of the unavailable resource, wherein the link archive was populated at a first time with URLs and titles existing at the first time;
      receive, from the link archive, search query data responsive to the request for the search query data, wherein the search query data includes metadata including a title of the resource, wherein the title of the resource is separate from the URL;
      send a request to search a second database for a substitute URL based on the search query data including the title of the resource, wherein the second database was populated at a second time with URLs and titles existing at the second time; and
      receive the substitute URL responsive to the request for the substitute URL, wherein a resource of the substitute is different than the unavailable resource.

2. The apparatus of claim 1, wherein, responsive to a request for the unavailable URL, the one or more processing devices are further operable to present the substitute URLs, search query data, or combinations thereof to a user terminal.

3. The apparatus of claim 1, wherein the processing device is further operable when executing the instructions to:
   search the first database, wherein the first database maps one or more unavailable URLs to the search query data; and
   search the second database using the search query data to identify the substitute URLs.

4. The apparatus of claim 1, wherein the substitute URL is one of a plurality of substitute URLs, wherein the processing device is configured to:
   rank the substitute URLs based on tracking of a number of times users select each of the plurality of substitute URLs; and
   establish a permanent redirect to a particular substitute URL based on the rank.

5. The apparatus of claim 1, wherein the substitute URL points to a second resource that is different than the unavailable resource.

6. An apparatus, comprising;
   one or more processing devices; and
   a memory coupled to the processing devices comprising instructions executable by the one or more processing devices, the processing devices operable when executing the instructions to:
      perform a first search of a first database using an unavailable URL to retrieve metadata including a title of an unavailable resource, wherein the first database is populated at a first time;

perform a second search of a second database for one or more substitute URLs, responsive to a request including search query data having a plurality of keywords derived from the metadata including the title of the unavailable resource, wherein the second database is populated at a second time; and perform a third search of one or more websites to periodically update the first database, the update including adding new URLs with associated new search query data from the one or more websites to the first database, wherein the new URLs are not yet identified in the first database.

7. The apparatus of claim 6, wherein the second search is performed by a first instance of a search engine and the first search and update is performed by a second instance of a search engine.

8. The apparatus of claim 6, wherein the one or more processing devices are further operable when executing the instructions to:

update the first database by adding new URLs with associated new search query data, wherein the first database stores data corresponding to current and broken URLs located on a particular website and wherein the update is performed by a publishing module corresponding to the particular website.

9. One or more non-transitory computer readable storage media encoded with software comprising computer executable instructions and when the software is executed operable to:

receive a request for a Uniform Resource Locator (URL);

determine that the URL is broken because the URL points to an unavailable resource;

determine if a first database includes query data corresponding to a plurality of search terms from a resource title from metadata associated with the URL, wherein the first database includes URLs and titles and was populated at a first time;

based on the determination, request one or more substitute URLs from a second database corresponding to the query data, wherein the one or more substitute URLs correspond to a substitute resource different than the unavailable resource, wherein the second database was populated at a second time; and send a message identifying the one or more substitute URLs responsive to the request for the URL, the one or more substitute URLs to be displayed on a graphical user interface.

10. The one or more computer readable storage media of claim 9, wherein the software when executed is further operable to send the search terms responsive to the request for the broken URL, the search terms to be displayed on the graphical user interface.

11. The one or more computer readable storage media of claim 9, wherein the software when executed is further operable to send display customization data based on the query data for customizing the graphical user interface display.

12. The one or more computer readable storage media of claim 9, wherein the software when executed is further operable to:

tag the broken URL and the one or more substitute URLs selected by a user to capture self-healing data; and introduce a permanent redirect from the broken URL to a particular substitute URL based on self-healing data.

13. An apparatus, comprising:

means for receiving a request for a metadata title including a broken URL;

means for looking up multiple keywords from the metadata title in a database that maps the metadata title to the broken URL, wherein the database was populated at a first time;

means for returning the metadata title responsive to the request;

means for crawling an internet archive for one or more URLs of interest and associated metadata titles, the internet archive for storing historical internet or website data, or combinations thereof, wherein the internet archive was populated at a second time;

means for retrieving the one or more URLs of interest and associated metadata titles; and means for mapping the one or more URLs of interest to the associated metadata titles in the database.

14. A method, comprising:

receiving a request for a Uniform Resource Locator (URL);

determining the URL is broken;

requesting search query data from a first database, wherein the search query data corresponds to a resource title of the broken URL, wherein the first database was populated at a first time; and requesting a plurality of substitute URLs from a second database, wherein the search query data corresponds to the plurality of substitute URLs, wherein the second database was populated at a second time;

tracking a number of times users select each of the plurality of substitute URLs;

ranking the plurality of substitute URLs according to relevance for the search query data; and implementing a permanent redirect to a particular substitute URL based on the ranking.

15. The method of claim 14, further comprising sending a message including the plurality of substitute URLs responsive to the request for the URL.

16. The method of claim 14, wherein:

the first database is for mapping the broken URL to the search query data; and the second database is for mapping the one or more substitute URLs to the search query data.

17. The apparatus of claim 13, wherein the search query data comprises one or more of the following: one or more document title terms, unique document identifier, unique webpage identifier, geographic location information, language, access level, metadata, country or last update time.

18. The apparatus of claim 17, further comprising:

means for identifying the URLs of interest by searching a weblog identifying one or more broken URLs.

* * * * *